(12) United States Patent
Willig

(10) Patent No.: US 6,684,339 B1
(45) Date of Patent: Jan. 27, 2004

(54) SYSTEM AND METHOD FOR TRANSFERRING INFORMATION FROM A FIRST DEVICE TO A SECOND DEVICE WHEN THE FIRST DEVICE GOES UNDER A REDUCED POWER MODE

(75) Inventor: Randy C. Willig, Fort Collins, CO (US)

(73) Assignee: Advanced Micro Devices, Inc., Sunnyvale, CA (US)

(*) Notice: Subject to any disclaimer, the term of this patent is extended or adjusted under 35 U.S.C. 154(b) by 527 days.

(21) Appl. No.: 09/669,392

(22) Filed: Sep. 26, 2000

(51) Int. Cl.[7] .............. G06F 1/30; G06F 15/16; G06F 11/00
(52) U.S. Cl. .............. 713/300; 709/232; 714/14
(58) Field of Search .............. 713/300, 320, 713/323, 324; 709/232; 714/22, 14

(56) References Cited

U.S. PATENT DOCUMENTS 4,315,162 A * 2/1982 Ferguson .............. 307/66
4,538,058 A * 8/1985 Ugon et al. .............. 235/380
6,092,207 A * 7/2000 Kolinski et al. .............. 713/323

FOREIGN PATENT DOCUMENTS

JP 10333998 A * 12/1998 .............. G06F/13/00

OTHER PUBLICATIONS

IBM, Processor–Controlled Battery Back–Up Power Supply Architecture, Aug. 1, 1988, vol 31, Issue 3, pp. 183–185.*

* cited by examiner

Primary Examiner—Dennis M. Butler
Assistant Examiner—Suresh K Suryawanshi

(57) ABSTRACT

For use in a system comprising a plurality of devices that are connected together in a network, there is disclosed a system and method of transferring information from a first device in the network to a second device in the network when the first device is operating in a reduced power mode. The first device comprises a second power supply for supplying power to the first device when a first power supply fails. The first device also comprises a controller for transferring information from the first device to a second device in the network when the first device is receiving power from the second power supply. The second device in the network receives power from its own first power supply. The second device receives information that has been transferred from the first device in the network.

20 Claims, 4 Drawing Sheets

SYSTEM AND METHOD FOR TRANSFERRING INFORMATION FROM A FIRST DEVICE TO A SECOND DEVICE WHEN THE FIRST DEVICE GOES UNDER A REDUCED POWER MODE

TECHNICAL FIELD OF THE INVENTION

The present invention is generally directed to a system and method of transferring information to individual devices in a network and, more specifically, to a system and method for transferring power management information to individual devices in a network when one of the devices in the network is operating in a reduced power mode.

BACKGROUND OF THE INVENTION

It is an increasingly common practice to connect numerous devices together in a network so that the individual devices may function together as a coordinated system. Each individual device in such a system usually has at least one microprocessor that is dedicated to the operational function of its respective device. Each device makes a contribution to the overall function of the networked system of devices.

The microprocessor based functions of each of the devices in a network may include, among other things, serving as an input device controller, a wireless data controller, a system fault analysis controller, and similar functions. Individual microprocessor-controlled devices in a network are not presently able to automatically change their operation to compensate for changes in the levels of available operating power.

There is therefore a need in the art for an improved system and method for improving the performance of individual devices that are connected in a network. In particular, there is a need in the art for an improved system and method for transferring information to individual devices in a network when one of the devices in the network is operating in a reduced power mode. More particularly, there is a need in the art for an improved system and method for transferring a task from a first device in a network to a second device in the network and for causing the second device to perform the task transferred from the first device when the first device is operating a reduced power mode.

SUMMARY OF THE INVENTION

To address the above-discussed deficiencies of the prior art, it is a primary object of the present invention to provide an improved system and method for transferring information to individual devices in a network when one of the devices in the network is operating in a reduced power mode.

The present invention generally comprises a system and method of transferring information from a first device in a network to a second device in the network when the first device is operating in a reduced power mode. The first device comprises a first power supply and a second power supply for supplying a lower level of power to the first device when the first power supply fails. The first device also comprises a controller for transferring information from the first device to a second device in the network when the first device is receiving power from the second power supply. The second device in the network receives power from its own first power supply. The second device receives information and performs tasks that have been transferred from the first device in the network.

It is an object of the present invention to provide a first device in a network that is capable of transferring information and tasks to a second device in the network when the first device is operating in a reduced power mode.

It is also an object of the present invention to provide a first device in a network that comprises a first power supply; a second power supply; and a power switch for causing the second power supply to supply power to the first device when the first power supply is not operating.

It is also an object of the present invention to provide a first device that comprises a plurality of sensors for obtaining data.

It is another object of the present invention to provide a controller for processing data from a plurality of sensors in the first device.

It is an additional object of the present invention to provide a memory for storing data that has been processed by the controller in the first device.

It is yet another object of the present invention to provide a controller that is capable of transferring unprocessed data to a second device in the network when the first device is receiving power from the second power supply.

It is also an object of the present invention to provide a controller that is capable of transferring unprocessed data to a control unit of the network when the first device is receiving power from the second power supply.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Although an advantageous embodiment of the present invention is described for use with the Internet, it is clear that the present invention is not limited to use with the Internet. Those skilled in the art will understand that the principles of the present invention may be implemented in an intranet, a local area network, a wide area network, or any suitably arranged network.

Figure 1:
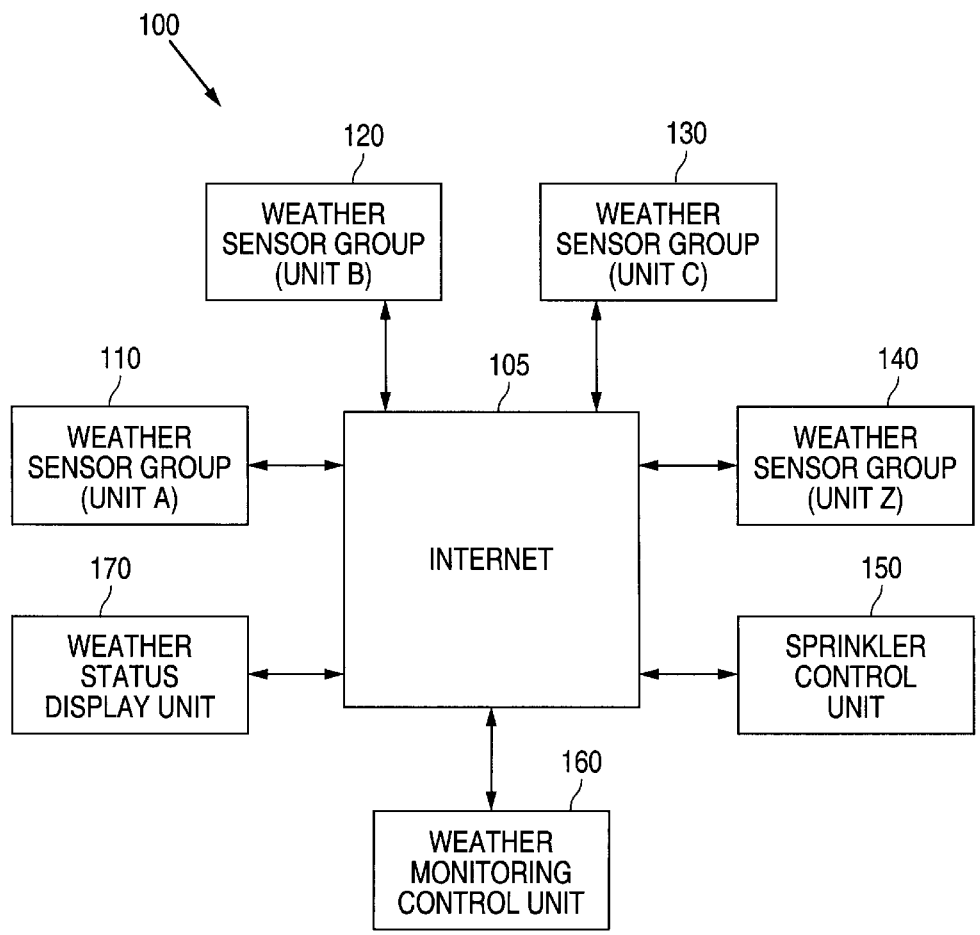
FIG. 1 illustrates an exemplary weather monitoring system comprising a plurality of individual devices connected together in a network according to an advantageous embodiment of the present invention.

FIG. 1 illustrates an exemplary distributed system 100 according to one embodiment of the present invention. System 100 monitors and displays information from a number of weather sensors located throughout a geographical area. System 100 also operates a distributed sprinkler system in response to information concerning existing weather conditions. The individual units of system 100 are connected to each other through Internet 105. Internet 105 allows the individual units of system 100 to communicate with each other through the exchange of Internet protocol (IP) data packets.

System 100 comprises weather sensor group (unit A) 110, weather sensor group (unit B) 120, weather sensor group (unit C) 130, weather sensor group (unit Z) 140, sprinkler control unit 150, weather monitoring control unit 160 and weather status display unit 170. Although only four weather sensor groups are shown in this example, it is clear that system 100 may comprise more than four (or less than four) weather sensor groups.

Each weather sensor group 110, 120, 130 and 140 comprises a plurality of sensors (not shown in FIG. 1) for measuring weather conditions such as temperature, barometric pressure, wind velocity and direction, precipitation, and the like. Weather information collected by the sensors of weather sensor group (unit A) 110 is collected and electronically processed within weather sensor group (unit A) 110. Weather sensor group (unit A) 110 sends the processed weather data via the Internet 105 to weather monitoring control unit 160 and weather status display unit 160. The other weather sensor groups 120, 130 and 140 collect, process and send weather data in the same manner.

Weather monitoring control unit 160 analyzes the processed weather data that it receives from the weather sensor groups 110, 120, 130 and 140. In response to the results of the analysis, weather monitoring control unit 160 then causes sprinkler control unit 150 to turn on and to turn off individual sprinklers (not shown) in the geographical area that is being monitored. The processed weather data from the weather sensor groups 110, 120, 130 and 140 are also displayed on weather status display unit 170.

Figure 2:
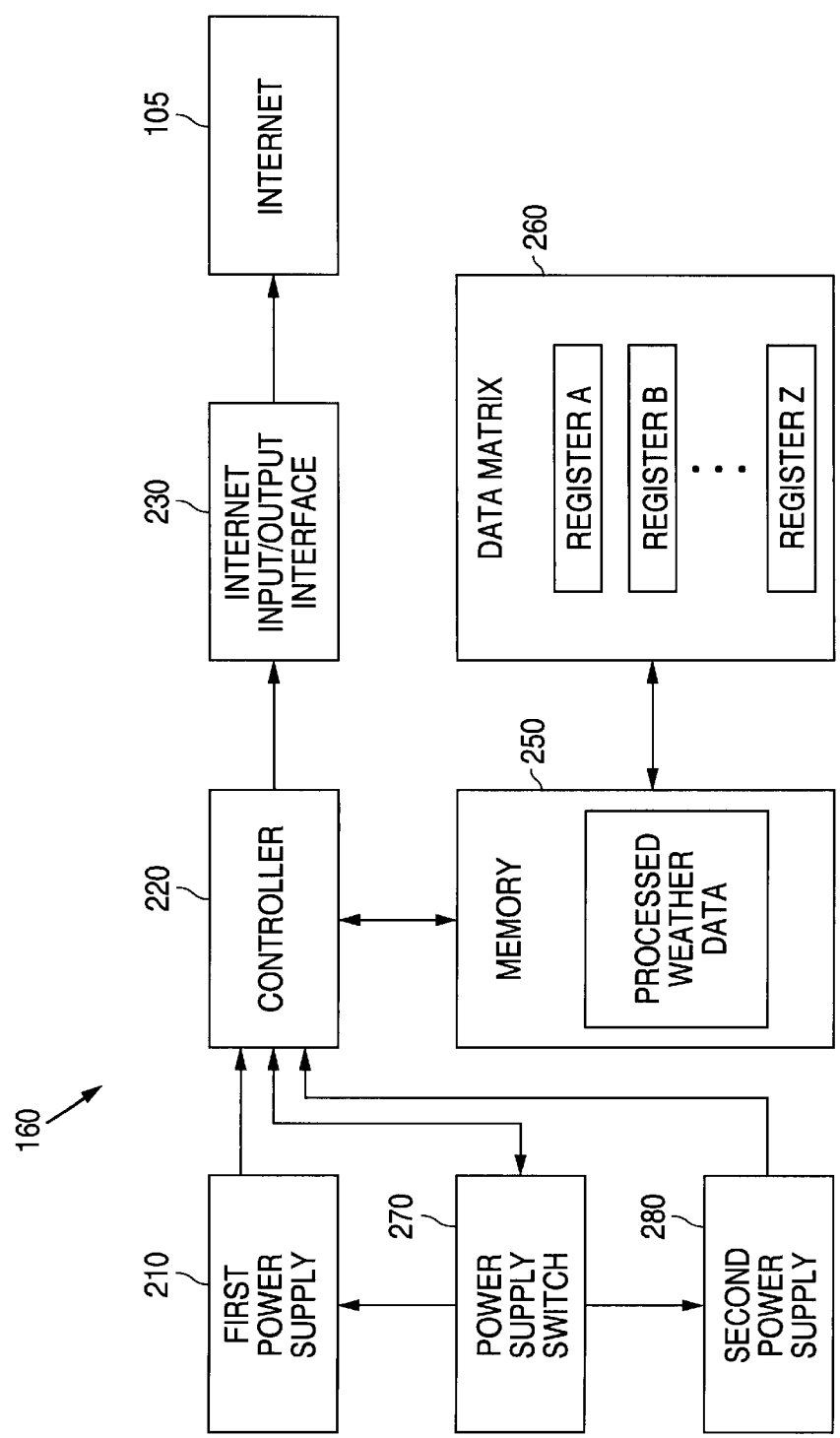
FIG. 2 illustrates a block diagram of one exemplary weather monitoring control unit for monitoring information from a plurality of weather sensor units according to one advantageous embodiment of the present invention.

FIG. 2 illustrates a block diagram of weather monitoring control unit 160 in exemplary system according to one embodiment of the present invention. Weather monitoring control unit 160 comprises first power supply 210, controller 220, memory 250 and Internet input/output interface 230. Internet input/output interface 230 couples weather monitoring control unit 160 to Internet 105. Memory 250 contains processed weather data from each of the weather sensor groups 110, 120, 130 and 140. The processed weather data may be stored in a data matrix 260 that is coupled to memory 250. For example, register A in data matrix 260 stores processed weather data from weather sensor group (unit A) 110. The processed weather data from each weather sensor group is stored in a separate register.

First power supply 210 is coupled to controller 220. First power supply 210 is also coupled to and supplies power to other elements of weather monitoring control unit 160 through power cables (not shown). Weather monitoring control unit 160 also comprises power supply switch 270 that is capable of changing the power source of controller 220 from first power supply 210 to second power supply 280. When the power level of first power supply 210 falls below a preselected minimum value, then controller 220 causes power supply switch 270 to activate second power supply 280 to supply power to controller 220. Second power supply 280 also supplies power to other elements of weather monitoring control unit 160 through power cables (not shown). Second power supply 280 has a lower level of power than first power supply 210. Second power supply 280 has sufficient power to operate weather control monitoring unit 160.

Figure 3:
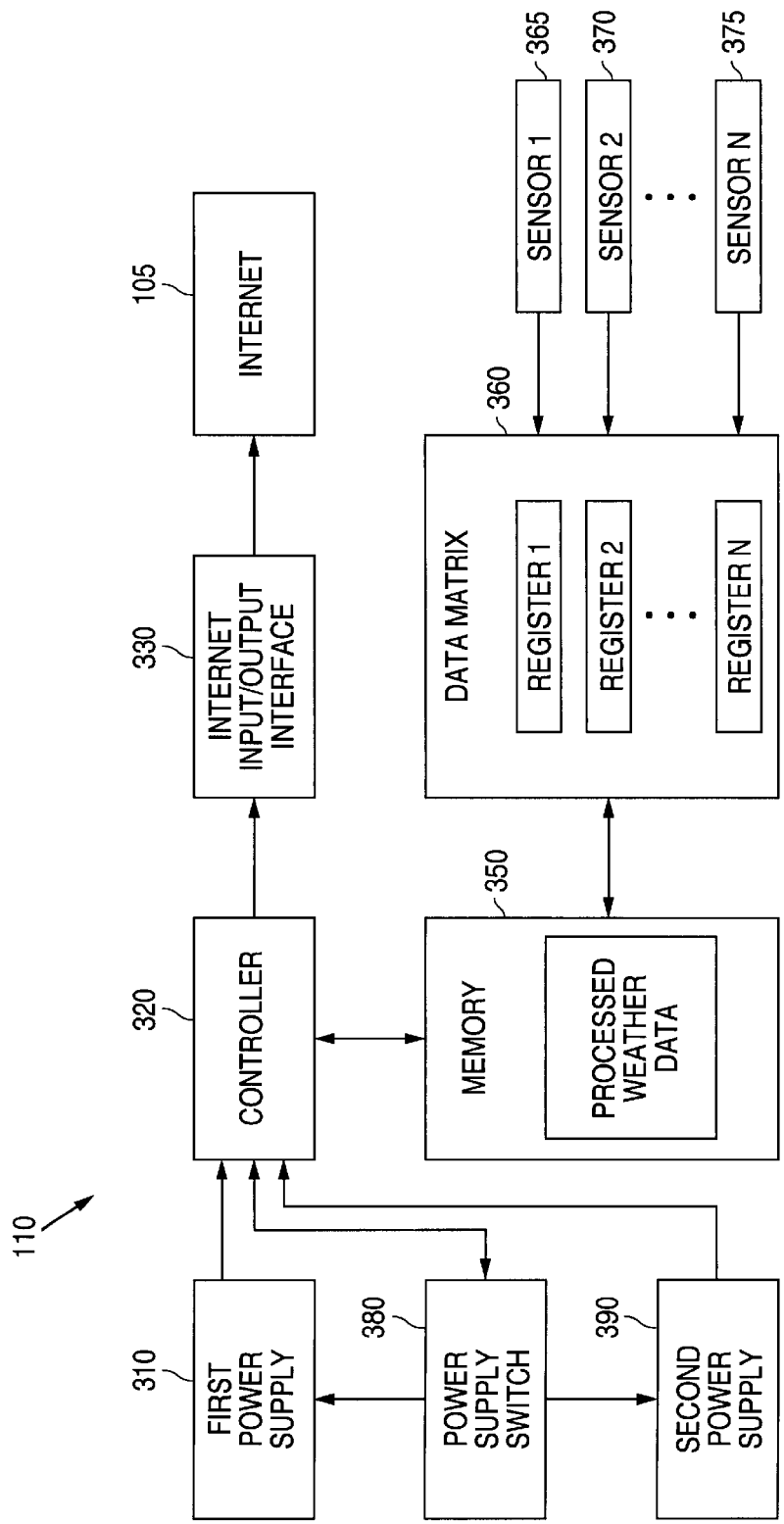
FIG. 3 illustrates a block diagram of an exemplary weather sensor unit having a first power supply and a second power supply according to one advantageous embodiment of the present invention.

FIG. 3 illustrates a block diagram of weather sensor group (unit A) 110 in exemplary system 100 according to one embodiment of the present invention. The other weather sensor groups 120, 130 and 140 are similar in structure to weather sensor group 110. Weather sensor group 110 comprises first power supply 310, controller 320, memory 350 and Internet input/output interface 330. Internet input/output interface 330 couples weather sensor group 110 to Internet 105.

As shown in FIG. 3, weather sensor group 110 comprises a plurality of weather sensors. For example, sensor 1 may be thermometer 365, sensor 2 may be barometer 370, and sensor N may be rain gauge 375. Although only three weather sensors are shown in FIG. 3, it is clear that weather sensor group 110 may comprise more than three (or less than three) weather sensors.

Sensors 365, 370 and 375 are coupled to data matrix 360. Data matrix 360 receives weather data from sensors 365, 370 and 375 and stores the weather data in registers. The weather data from each weather sensor is stored in a separate register. Register 1 in data matrix 360 stores weather data from weather sensor 365. Register 2 in data matrix 360 stores weather data from weather sensor 370. Register N in data matrix 360 stores weather data from weather sensor 375.

Memory 350 receives weather data from each of the weather sensors 365, 370, 375 through data matrix 360. Controller 320 processes the weather data from sensors 365, 370 and 375 and sends the processed weather data to weather monitoring control unit 160 and to weather status display unit 170 via the Internet 105. As shown in FIG. 3, the processed weather data may also be stored in memory 350 for transmittal at selected times.

First power supply 310 is coupled to controller 320. First power supply 310 is also coupled to and supplies power to other elements of weather sensor group 110 through power cables (not shown). Weather sensor group 110 also comprises a power supply switch 380 that is capable of changing the power source of controller 220 from first power supply 310 to second power supply 390. When the power level of first power supply 310 falls below a preselected minimum value, then controller 320 causes power supply switch 380 to activate second power supply 390 to supply power to controller 320. Second power supply 390 also supplies power to other elements of weather sensor group 110 through power cables (not shown). Second power supply 390 has a lower level of power than first power supply 310. Second power supply 390 usually comprises a battery.

Second power supply 390 has sufficient power to obtain weather data from sensors 365, 370 and 375 but not sufficient power to process the weather data. That is, second power supply 390 is capable of sending unprocessed weather data via Internet 105 to another of the weather sensor groups 120, 130 or 140 (or to weather monitoring control unit 160) for processing. Second power supply 390 does not have sufficient power for weather sensor group 110 to process the weather data that has been collected.

Whenever a first power supply fails in one of the weather sensor groups 110, 120, 130 or 140 of system 100, the other weather sensor groups in system 100 are capable of receiving unprocessed weather data via Internet 105 from the weather sensor group that has experienced a failure of its first power supply. The weather sensor group that receives the unprocessed weather data is capable of processing the weather data and sending it to weather monitoring control unit 160.

The failure of a first power supply in one of the weather sensor groups 110, 120, 130 or 140 of system 100 is only one example of how a network device may be required to operate in a reduced power mode. The receipt of unprocessed weather data by the other weather sensor groups in system 100 is only one example of how a network system may respond to a network device that is operating in a reduced power mode.

The normal operation of a network device may require increased levels or decreased levels of available power from time to time. That is, a power failure is not the only instance in which a network device may be required to operate in a reduced power mode. Individual network devices may require differing levels of power at different times.

Each network device comprises a controller that is capable of transferring information to other network devices in the network. The transferred information may comprise (1) raw data, (2) data processing algorithms, (3) data processing protocols, (4) estimated power requirements, and (5) data processing tasks to be accomplished.

The category "data processing protocols" may include specific instructions for data processing such as (1) process the data using the fastest method possible, (2) process the data using the least amount of power, (3) process the data at the point of origin of the data, (4) process the data at the point where the data is to be used, and (5) process the data using power having minimal cost.

The information transferred from a first device in a network to a second device in the network may be transferred using, for example, Java applets. The transfer of information (data and instructions) may continually proceed to and from each device in the network as may be required.

For example, consider raw data that is recorded in a first device in a network. The raw data is normally processed in the first device when the first device is operating at a normal power level. The raw data may be transferred to a second device when the first device begins to operate in a reduced power mode. The reduced power mode can be caused by the first device receiving an instruction from a network control unit to operate in a reduced power mode. Alternatively, the reduced power mode can be caused by the first device detecting a power failure in an internal power supply.

Figure 4:
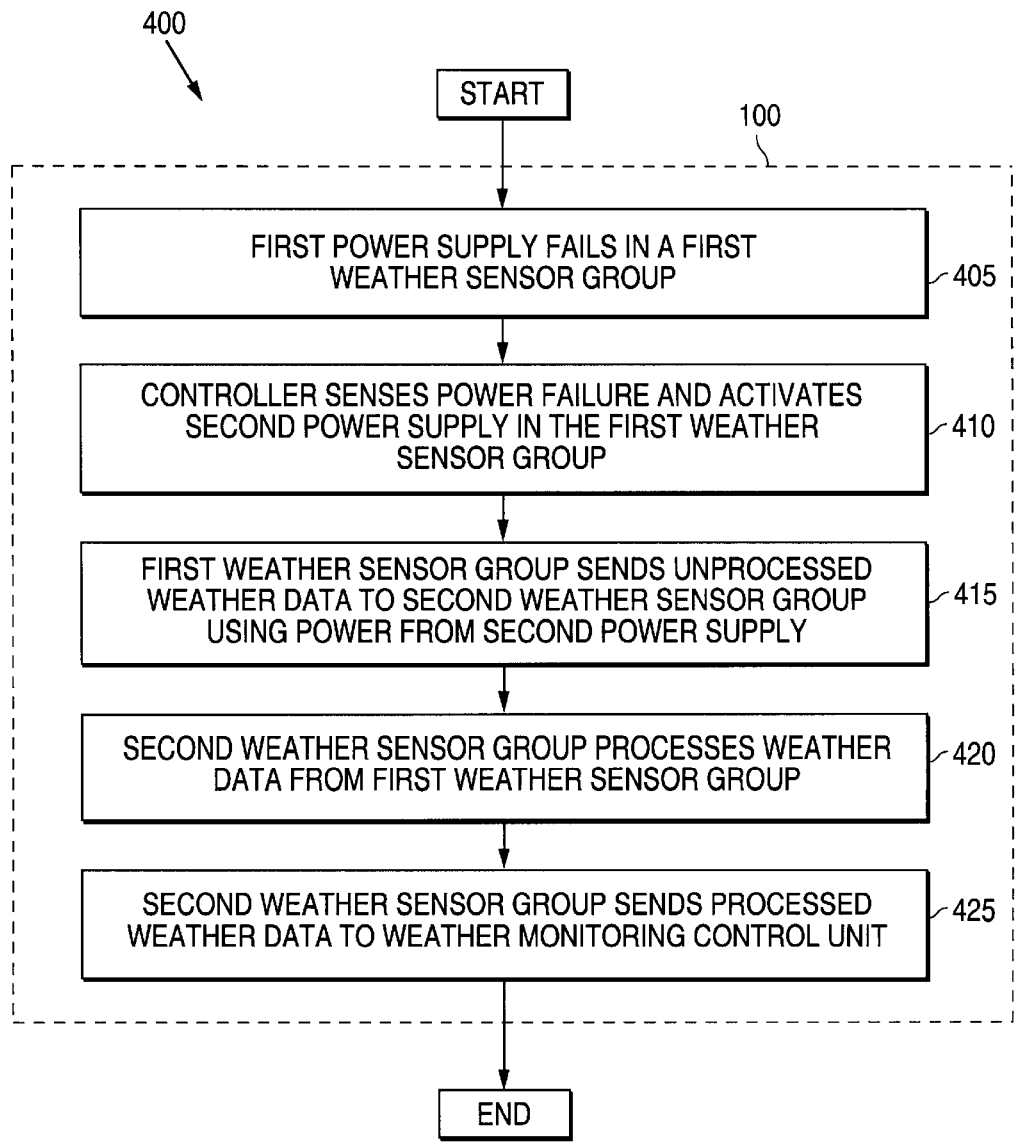
FIG. 4 illustrates a flow diagram showing the operation of an exemplary weather monitoring system comprising a plurality of individual devices connected together in a network according to one advantageous embodiment of the present invention.

FIG. 4 depicts flow diagram 400 which illustrates the operation of exemplary system 100 according to one embodiment of the present invention. Flow diagram 400 shows how system 100 is able to transfer information from a first unit of system 100 to a second unit of system 100 in cases where the first unit of system 100 in operating in a reduced power mode due to a power failure.

Assume that a first power supply fails in a weather sensor group. For example, first power supply 310 fails in weather sensor group 110 ("first weather sensor group") (process step 405). Controller 320 senses that first power supply 310 has failed and activates second power supply 390 (process step 410). Weather sensor group 110 operating on the power supplied by second power supply 390 does not have sufficient power to process the weather data from sensors 365, 370 and 375. However, the power supplied by second power supply 390 is sufficient to send the unprocessed weather data to another location for processing.

Weather sensor group 110 sends the unprocessed weather data from sensors 365, 370 and 375 to weather sensor group 120 ("second weather sensor group") for processing (process step 415). The unprocessed weather data can be sent to any weather sensor group in system 100 that is operating with a first power supply. Alternatively, the unprocessed weather data can be sent directly to weather monitoring control unit 160 for processing by weather monitoring control unit 160.

Because weather sensor group 120 is operating with a first power supply, it has sufficient power to process weather data. Weather sensor group 120 then processes the weather data from weather sensor group 110 (process step 420). After the processing of the weather data is complete, weather sensor group 120 sends the processed weather data of weather sensor group 110 to weather monitoring control unit 160 (process step 425).

In this manner a first unit of system 100 (i.e., weather sensor group 110) that has experienced a reduction in capability due to a power failure in its first power supply transfers via a network (i.e., Internet 105) a portion of its assigned task to a second unit of system 100 (i.e., weather sensor group 120). The present invention permits the efficient transmission of information and the efficient reallocation of tasks between units in a network system.

Although the present invention has been described in detail, those skilled in the art should understand that they can make various changes, substitutions and alterations herein without departing from the spirit and scope of the invention in its broadest form.

What is claimed is:

1. For use in a system comprising a plurality of devices that are connected together in a network, a first device of said system that is capable of transferring information from said first device to a second device of said system when said first device operates in a reduced power mode, where said first device comprises:

a first power supply capable of supplying a first level of power to said first device;

a second power supply capable of supplying a second lower level of power to said first device;

a power switch coupled to said first power supply and to said second power supply, said power switch capable of causing said second power supply to provide said second lower level of power to said first device when said first device operates in a reduced power mode; and a controller coupled to said network, said controller capable of transferring information from said first device to said second device of said system when said first device is receiving said second lower level of power from said second power supply.

2. The first device of said system as set forth in claim 1 further comprising a memory coupled to said controller, wherein said controller is capable of processing data and said memory is capable of storing data that has been processed by said controller.

3. The first device of said system as set forth in claim 2 further comprising a plurality of sensors coupled to said memory, said plurality of sensors capable of obtaining data.

4. The first device of said system as set forth in claim 3 further comprising a data matrix coupled between said memory and said plurality of sensors, said data matrix capable of storing data obtained by said plurality of sensors.

5. The first device of said system as set forth in claim 3 wherein said controller is capable of transferring unprocessed data collected by said plurality of sensors to said second device of said system when said first device is receiving said second lower level of power from said second power supply.

6. The first device of said system as set forth in claim 1 wherein said controller is capable of transferring information to a control unit of said system when said first device is receiving said second lower level of power from said second power supply.

7. The first device of said system as set forth in claim 3 wherein said controller is capable of transferring unprocessed data collected by said plurality of sensors to a control unit of said system when said first device is receiving said second lower level of power from said second power supply.

8. A system comprising:

a plurality of devices that are connected together in a network where each device of said plurality of devices is capable of performing; and a control unit that is capable of receiving data from each of said plurality of devices;

wherein a first device of said plurality of devices is capable of transferring information at least one task to a second device of said plurality of devices when said first device operates in a reduced power mode.

9. The system as set forth in claim 8 wherein said first device of said plurality of devices is capable of transferring information to said control unit when said first device operates in a reduced power mode.

10. A system comprising:

a plurality of devices that are connected together in a network comprising a first device of said system that is capable of transferring information from said first device to a second device of said system when said first device operates in a reduced power mode, where said first device comprises:

a first power supply capable of supplying a first level of power to said first device;

a second power supply capable of supplying a second lower level of power to said first device;

a power switch coupled to said first power supply and to said second power supply, said power switch capable of causing said second power supply to provide said second lower level of power to said first device when said first device operates in a reduced power mode; and a controller coupled to said network, said controller capable of transferring information from said first device to said second device of said system when said first device is receiving said second lower level of power from said second power supply.

11. The system as set forth in claim 10 where said first device of said system further comprises a memory coupled to said controller, wherein said controller is capable of processing data and said memory is capable of storing data that has been processed by said controller.

12. The system as set forth in claim 11 where said first device of said system further comprises a plurality of sensors coupled to said memory, said plurality of sensors capable of obtaining data.

13. The system as set forth in claim 12 where said first device of said system further comprises a data matrix coupled between said memory and said plurality of sensors, said data matrix capable of storing data obtained by said plurality of sensors.

14. The system as set forth in claim 12 wherein said controller of said first device of said system is capable of transferring unprocessed data collected by said plurality of sensors to said second device of said system when said first device is receiving said second lower level of power from said second power supply.

15. The system as set forth in claim 10 wherein said controller of said first device of said system is capable of transferring information to a control unit of said system when said first device is receiving said second lower level of power from said second power supply.

16. The system as set forth in claim 12 wherein said controller of said first device of said system is capable of transferring unprocessed data collected by said plurality of sensors to a control unit of said system when said first device is receiving said second lower level of power from said second power supply.

17. For use in a system comprising a plurality of devices that are connected together in a network, a method of transferring information from a first device of said system to a second device of said system when said first device operates in a reduced power mode, the method comprising the steps of:

supplying a first level of power to said first device with a first power supply;

changing said first power supply of said first device to a second power supply;

supplying a second lower level of power to said first device with said second power supply;

transferring information from said first device to said second device of said system when said first device is receiving said second lower level of power from said second power supply.

18. The method as claimed in claim 17 further comprising the step of transferring information from said first device to a control unit of said system when said first device is receiving said second lower level of power from said second power supply.

19. The method as claimed in claim 17 further comprising the steps of:

obtaining data from a plurality of sensors of said first device;

transferring data collected by said plurality of sensors to said second device of said system when said first device is receiving said second lower level of power from said second power supply; and processing said data in said second device of said system.

20. The method as claimed in claim 17 further comprising the steps of:

obtaining data from a plurality of sensors of said first device;

transferring data collected by said plurality of sensors to a control unit of said system when said first device is receiving said second lower level of power from said second power supply; and processing said data in said control unit of said system.

* * * * *